INVENTORS
GOTTFRIED STRAUSS
HELMUT HEUSS
GERHARD SIMON

BY Wenderoth, Lind & Ponack
ATTORNEYS

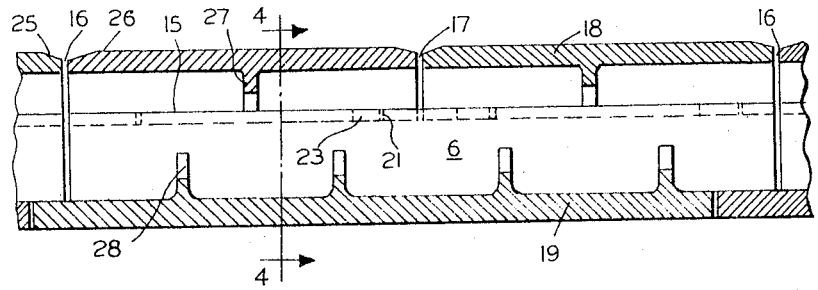
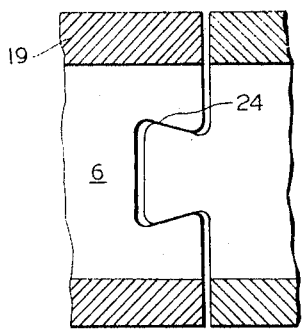
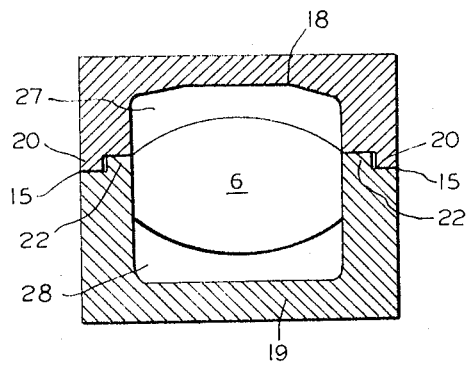
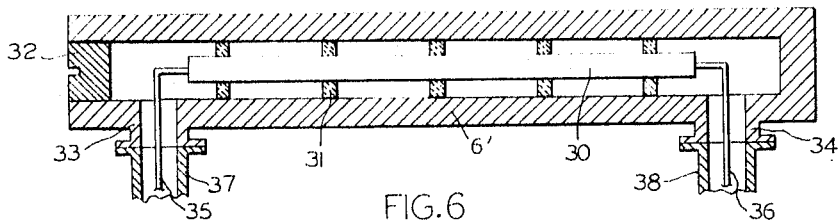
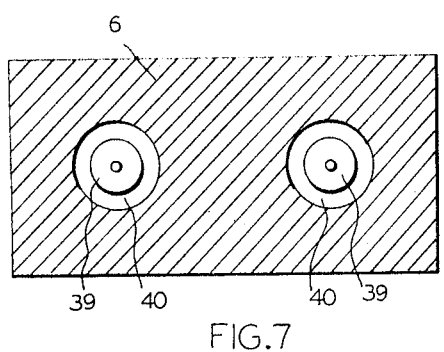

United States Patent Office 3,463,863
Patented Aug. 26, 1969

3,463,863
HEATING DEVICE FOR THE EQUALIZING
HEARTH OF A PUSHER-TYPE FURNACE
WITH COOLED SLIDE BARS
Gottfried Strauss and Helmut Heuss, Essen, and Gerhard Simon, Remscheid, Germany, assignors to Didier-Werke A.G., Wiesbaden, Germany
Filed Dec. 19, 1966, Ser. No. 603,002
Claims priority, application Germany, Dec. 17, 1965,
D 48,936
Int. Cl. H05b 3/02
U.S. Cl. 13—20          5 Claims

ABSTRACT OF THE DISCLOSURE

The heating device comprises heating hollow beams which are a continuation of the slide bars or rails of a pusher type furnace extending into an equalizing hearth to eliminate temperature differences in the material heated. The beams may be heated by gas or electricity and are constructed of heat resistant and erosion resistant material.

---

The majority of furnaces are provided with slide bars or rails, on which the material to be heated is transported and which are in many cases cooled with water or a water-steam mixture. The cooled slide bars engender temperature differences or cool spots at the points of contact with the material to be heated, which cannot completely be eliminated in the next-following equalizing hearth and which give rise to thickness deviations upon rolling of the heated material.

The industry has made many attempts to reduce to a minimum these prejudicial effects of the slide bars on the material to be heated, which are constantly increasing under current conditions. For example, slide bars have been provided with slide surfaces of heat resistant steel to prevent a direct cooling action of the slide bars on the material to be heated. Such expedients, however, are not satisfactory at temperatures above 1300° C. and, in addition, are quite expensive.

It is also known to supplementarily heat the equalizing hearth from below, in order to counteract warm spots arising on the underside of the material to be heated on sliding along the slide bars. To this end, in one known construction, the equalizing hearth surfaces and the supporting surfaces constituting a continuation of the slide bars were provided with upwardly open channels traversed by heating gas, which however does not result in effective heat exchange, since the heating of the material takes place near the dark spots. In any case, heat shadows remain in the region of the applied surfaces, the temperature of which is about 200° C. below the remaining average temperature of material being heated. In addition the channels become filled with scale and/or cinders, which must constantly be removed in order to make possible unobstructed flow of the heating gas.

Attempts to cover the channels with plates of refractory material or heat resistant cast steel did not realize the desired success. Consequently the fire resistant material, which is subject to enormous erosion, had to be comparatively thick, which prejudiced the heat transfer from the heating channels to the material to be heated. The situation is the same with heat resistant cast steel plates which, at a thickness favorable to heat transfer became warped and wavy so that the moving material to be heated was torn from its support which could result in complete destruction of the hearth surfaces.

An object of the invention is to improve the heating means of the equalizing hearth of kilns with the purpose of largely eliminating cooling spots or shadows in the material to be heated, without thereby introducing prejudicial influence or disadvantageous results in the operation and in the length of life of the hearth.

A further object according to the invention is to arrange in the equalizing hearth in extension of the cooled slide bars hollow-shaped beams which are preferably rectangular in cross section and which can be heated by heating devices to about 1300° C., said beams being of heat resistant and abrasion resistant cast steel or other material with like properties. Such heating beams, in contrast to the cover plates, have an in se closed configuration, so that even with a relatively thin wall thickness, which makes possible good heat transfer, they can withstand heaviest mechanical requirements. Thus there is realized with a heating beam wall thickness of about 27 mm. which satisfies mechanical requirements in the temperature transfer region, a heating of about 100° C. to 150° C. of the cool spots or shadows or of the cooling strip of the successively disposed pieces of material to be heated, which represents a considerable step forward in the art, since a maximum heat yield with maximum strength of the equalizing hearth is achieved.

The heating of the heating beams can be effected in various ways, e.g. by burners regulable in accordance with the temperature, waste gases being preferably led to the heating chamber of the furnace. In this way, on the one hand, a uniform heat transfer to the material to be heated is achieved along the entire longitudinal extent of the heating beams, thus realizing best possible utilization of the heating beam capacity, and on the other hand the still comparatively highly heated heating beams waste gases can in simple manner be used for supplemental heating of the furnace part anteriorly of the equalizing hearth. Further, a substoichiometrically operated burner and air nozzles distributed along the length of the heating beams for supplying combustion air for the unburned burner gas, can be provided. It is also possible to distribute a plurality of burners along the length of the heating beams.

A further object of the invention resides in the provision in the hollow chamber of the heating beam of electrical heating elements, for example heating coils or heating rods, supported on ceramic material. In this way, a practically absolutely uniform heating of the heating beam can be realized, the temperature of which can be relatively easily kept at any desired temperature value along the entire length of the beam, in addition to which a regulable current consumption is made possible and no inadequate current flows can arise.

A still further object is to construct the heating beams advantageously of several individual parts in order to simplify handling and manufacture thereof, and also to make possible local replacement of any parts which may have become damaged. The heating beams can be cut into sections along the longitudinal extent thereof and may also be sectioned along the vertical extent thereof by a longitudinally extending cut, abutting surfaces being joined together in stepped form and by any other type of joint. The parts of the heating beams which comprise the heat transfer surfaces can be made of particularly high-value material and can be thin-walled. Stiffening or reinforcing ribs can also be provided along the inner sides of the heating beams, to enhance their stability.

A further object, as where the heating beams are not subject to undue stresses, the parts of the beams which are contacted by the sliding material to be heated and which constitute the heat transfer parts, are made of high grade material, preferably heat resistant steel, while the other parts are made of refractory material, from which the equalizing hearth is made.

In general, the heating beams are embedded in the refractory material of which the equalizing hearth is made, but it is also possible of constructing the supporting surfaces of the equalizing hearth by joining together a suitable number of heating beams, provided the necessary prerequisites are present.

Particularly for electrical heating, instead of hollow heating beams or heating beam parts, use can be made of solid shaped beams or beam parts, which are provided with bores for the reception of heating elements. Preferably the heating beam hollow spaces are made gastight and are provided with connections for bringing heating gas into contact with the heating elements, in order thereby far-reachingly to protect the heating elements against oxidation.

A still further object is to cool the electric conduit for the heating elements which are passed through the furnace hearth or other highly heated parts of the furnce, and this can be realized for example by placing the said conduits in pipes or channels through which the protector gas for the heating elements is supplied and withdrawn.

With the above and other objects in view which will become apparent from the detailed description below, some preferred embodiments of the invention are shown in the drawings in which:

FIG. 3 is a part longitudinal section through a heating beam on an enlarged scale.

FIG. 4 is a cross section along lines 4—4 of FIG. 3.

FIG. 5 shows a connecting joint in the heating beam.

FIG. 6 is a longitudinal section through an electrically heating beam part.

FIG. 7 is a cross section through a heating beam, which is also electrically heated.

Figure 1:
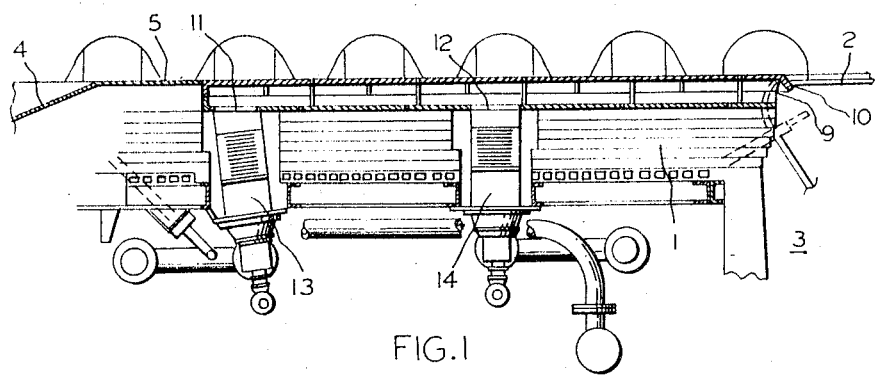
FIG. 1 is a longitudinal view through an equalizing hearth provided with heating beams.
Figure 2:
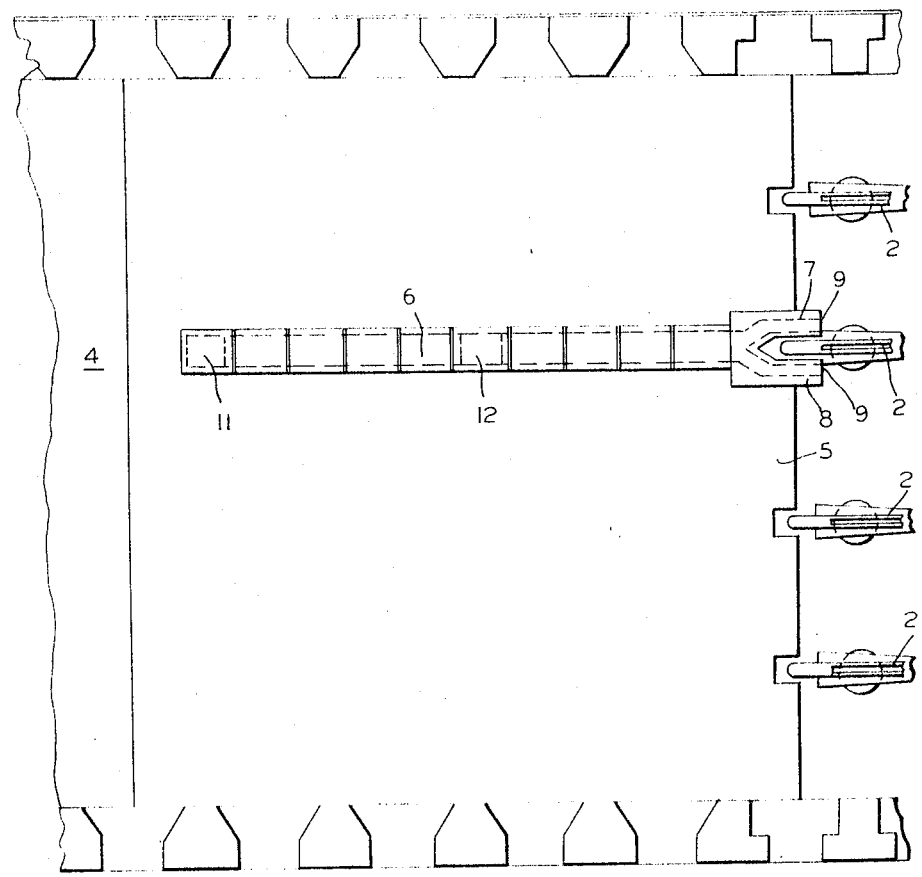
FIG. 2 is a top plan view through a hearth according to FIG. 1.

In FIGS. 1 and 2, reference numeral 1 designates the equalizing hearth which is a continuation of the kiln 3 (not further shown for the sake of simplicity) which is provided with cooled slide bars 2, the said hearth terminating at 4. Heating beams 6 (of which only one is shown in FIG. 2 for the sake of simplicity) are arranged at the supporting surface 5 of the equalizing hearth 1, the beams constituting continuations of the slide bars 2.

The hollow heating beams 6 which are made of heat resistant cast steel have a rectangular cross section and are closed at the end thereof adjacent the outlet end of the hearth 1, while the other end of the beams 6 encompass the slide bars in the manner of a fork, the forward sides of the extension 7 and 8 which form the fork leaving free openings 9 which are covered by a nose-like extension 10 of the upper wall of the heating beam.

At the underside thereof, the heating beams 6 are provided near the closed end and in the central area with openings 11 and 12 for the reception of heating devices 13 and 14, the heating gas of which heats the heating beam and is then withdrawn by the front openings 9 of the fork-shaped ends.

As shown more especially in FIGS. 3 to 5, the heating beams 6 are subdivided into a plurality of individual parts, namely in a longitudinally extending separating plane 15 which is parallel to the upper and lower heating beam sides, and by alternate cross sectional planes 16 and 17, of which the planes 16 extend through both resulting heating beam parts 18 and 19, while the planes 17 extend merely through the upper half 18 of the heating beam.

The upper and lower beam halves 18 and 19 are joined together by means of a stepped-type joint (FIG. 4), whereby on both sides of the planes 16 and 17 the downwardly projecting step 20 of the upper beam half 18 is interrupted by a recess 21 in which is engaged the correspondingly shaped rib 23 provided laterally on the step 22 of the lower heating beam half 19, so that an interlock is established which prevents relative displacement of the two heating beam halves 18 and 19 in the longitudinal direction. A further joint is provided at the through-going planes 16, where the lower beam halves are interconnected by means of a dovetail coupling 24, as shown in FIG. 5.

In addition, the upper surfaces of the upper heating beam halves 18 are provided at planes 16 and 17 with inclined surfaces 25 and 26 directed toward the separating planes, which makes possible a free sliding of the material to be heated. Finally, transverse ribs 27 and 28 are alternately provided on the inside of the upper and lower heating beam halves to render the beams resistant to thermal and mechanical stresses.

FIG. 6 illustrates a section of a heating beam 6 which is provided interiorly thereof with electrical heating elements 30 in the form of rods or coils, which are supported by ceramic heat conductor carriers 31. The hollow space of the heating beam is surrounded on all sides by the walls of the heating beam section 6' up to the end which is closable by a closure 32, the heating beam being provided adjacent each end with a tubular connecting arm 33 or 34 through which the electric wires 35 and 36 for the heating element 30 pass. The arms 33 and 34 are provided with flanges for the connection of tubular conduits 37 and 38, through which the oxidation preventing gas in the interior of the heating beam section is supplied and withdrawn and which may simultaneously serve for cooling the electrical conductor connections.

According to the embodiment of FIG. 7, the heating beam 6 is solid and is provided with bores 40 for the reception of heating elements 39. The configuration of the beam and the number and configuration of the bores may be varied from the showing according to FIG. 7.

We claim:

1. Heating means for the equalizing hearth of a push type furnace comprising a longitudinal extension of the cooled slide bars of the furnace, prefabricated hollow heating beams of a closed configuration of a material having a high heat and wear resistance with good heat conductibility located in said extension forming continuations of said slide bars, said beams at their upper side in the heat transfer region for the material to be heated having a relatively thin contact wall to eliminate cool spots and shadows in said material to be heated, regulable heating means located in said hollow closed configuration heating beams and nozzles distributed uniformly along said heating beams to supply air to said heating means.

2. Heating means as set forth in claim 1 wherein said regulable heating means are gas burners.

3. Heating means as set forth in claim 1 wherein said regulable heating means are electrical heating means.

4. Heating means according to claim 1 wherein each heating beam is subdivided into parts in crass sectional direction by cuts in the vertical direction by a cut extending longitudinally of the beam and said ports are joined at abutting surfaces by step-shaped joints.

5. Heating means according to claim 1 wherein the parts of the heating beam contacted by the material to be heated having the heat transfer surfaces, are made of heat resistant cast steel, while the remaining parts consist of refractory material.

References Cited

UNITED STATES PATENTS

| 2,180,089 | 11/1939 | McDermott. |
|---|---|---|
| 3,081,073 | 3/1963 | Conway. |
| 3,100,811 | 8/1963 | Bloom. |
| 3,214,152 | 10/1965 | Molz. |

BERNARD A. GILHEANY, Primary Examiner

H. B. GILSON, Assistant Examiner

U.S. Cl. X.R.

263—6